United States Patent [19]
Jacobsen et al.

[11] Patent Number: 6,146,052
[45] Date of Patent: Nov. 14, 2000

[54] DYNAMIC CONTROL CABLE FOR USE BETWEEN A FLOATING STRUCTURE AND A CONNECTION POINT ON THE SEABED

[75] Inventors: Gunnar Monrad Jacobsen, Vestskogen; Arild Figenschou, Billingstad; Leif Høie, Oslo, all of Norway

[73] Assignee: Kvaerner Oilfield Products a.s, Olso, Nauru

[21] Appl. No.: 09/056,684

[22] Filed: Apr. 8, 1998

[30] Foreign Application Priority Data

Apr. 29, 1997 [NO] Norway ..................................... 971984

[51] Int. Cl.[7] ........................... E21B 43/013; E21B 17/00
[52] U.S. Cl. ....................... 405/169; 166/338; 405/195.1; 405/170
[58] Field of Search ..................................... 405/169–171, 405/158, 195.1; 166/345, 343, 338

[56] References Cited

U.S. PATENT DOCUMENTS

| | | | |
|---|---|---|---|
| 4,332,509 | 6/1982 | Reynard et al. | 405/170 X |
| 4,570,716 | 2/1986 | Genimi et al. | 405/169 X |
| 4,906,137 | 3/1990 | Maloberti et al. | 405/195.1 |
| 5,437,518 | 8/1995 | Maloberti et al. | 166/342 X |

FOREIGN PATENT DOCUMENTS

| | | |
|---|---|---|
| 1 210 206 | 10/1970 | United Kingdom . |
| 2 206 144 | 12/1988 | United Kingdom . |
| WO 93/17176 | 9/1993 | WIPO . |

*Primary Examiner*—Dennis L. Taylor
*Attorney, Agent, or Firm*—Young & Thompson

[57] ABSTRACT

A dynamic control cable string or umbilical intended to hang in catenary form between a connection point on the seabed and a connection point located at the sea surface which can be attached to a floating structure; the umbilical is of the type that is low in weight per running meter and comprises flowlines and optionally current-conducting cables, all of which are twisted around the longitudinal axis of the string and are spaced apart from an axially extending core member and lie in channels in spacers for free axial movement of the cables and conduits in the channels; the core member, throughout the entire length of the control cable string functions as a load-bearing member and, in a portion of the length, all fluid transport and signal communication takes place peripherally relative to the core member.

15 Claims, 4 Drawing Sheets

DYNAMIC CONTROL CABLE FOR USE BETWEEN A FLOATING STRUCTURE AND A CONNECTION POINT ON THE SEABED

BACKGROUND OF THE INVENTION

The present invention relates to a dynamically working umbilical or control cable string, intended to hang in a catenary form between a connection point on the seabed and a connection point located on the surface and which may be attached to a floating structure, which umbilical is of the type having low weight per running meter and includes flowlines and optionally current conducting cables, all of which are twisted around the longitudinal axis of the conduit and lie in channels in spacers for free axial movement of the cables and flowlines in the said channels.

DESCRIPTION OF THE RELATED ART

Umbilicals of this type are designed for subsea use for the transfer of energy, signals and fluids in one or both directions. As used here, the designation "umbilical" is intended to embrace a flexible or bendable bundle of conduits and cables which comprises many transmission lines such as electric cables, for both energy and signals, and fluid transport lines, for both liquid and gas. Typically, these transport lines will be of steel having a fairly small diameter and may, for example, be used for high-pressure hydraulic fluid for actuating equipment such as valves on the seabed. Furthermore, conventionally they include a central steel conduit of larger diameter for transport of larger amounts of fluid, such as methanol for injection into an oil or gas well. One or more of the flowlines may also be used for chemicals which are to be injected into a formation or for feedback of "spent" fluid. A control cable string of this type is exemplified and described in NO. 920689 (WO 93/17176), and among persons versed in the art they are known as "umbilicals". However, it is not crucial that the umbilical includes electric conductors in the cross section, and it may conceivably be a pipe bundle for the transport of produced oil and gas to the surface in the same way as risers.

A previous use of such control cables was between a surface vessel and a submersed remote controlled vehicle.

When an umbilical or control cable is connected to a surface vessel or floating structure, the movements of the vessel or structure will be transmitted to the umbilical. The metallic pipes will then be subjected, to some extent, to great bending and tensile stresses. Naturally, this situation is the most unfavourable possible since the bending loads on the umbilical will be greatest at the top towards the connection point to the floating structure, whilst the cable cross-section of the umbilical in this very same area has the greatest tensile load because of the weight of the cable hanging down towards the bottom. This gives rise to a situation wherein the cable initially is under tensile stress which gives correspondingly less of a margin for bending stresses before yield stresses appear in the pipe materials. When these bending and tensile stresses exceed certain values, local plastic deformations occur and after this happens repeatedly, the steel pipes will be vulnerable to fatigue and fracture. In order to limit the size of the bending stresses it has been customary to provide bend stiffeners on the upper section of the umbilical, i.e., on the last 20 to 30 meters of umbilical up towards the floating structure. The bend stiffeners are mounted on the outside of the umbilical, and generally have an increasing cross-section in the upward direction, and are secured as a rule to the termination in the end thereof. It will thus be understood that when the movements of the floating structure are expected to be substantial, the bend stiffeners must also be substantial. Today, these bend stiffeners already have considerable dimensions and have almost reached their practically feasible outer limits. In addition to the movements of the floating structure, movements caused by currents in the water must also be taken into account. This affects the umbilical along the length thereof that suspends totally or partly free. It is usual to have limiting values for these movements too.

SUMMARY OF THE INVENTION

One of the main objects of the present invention is to reduce the load on the central large steel conduit, and especially in the area in the vicinity of the connection point for the floating structure.

It has also been a desire to provide a method for increasing the weight of the umbilical along certain parts or sections of its length, and also a way to make attachments on the umbilical so that it can be anchored to an attachment or attachments on the seabed or to buoyancy bodies.

Thus, a new design of the cross-section of the umbilical is provided, either along the whole of the part which runs from the seabed up to the sea surface or only in the end which runs up towards the connection point for the floating structure, so that stresses in the metal pipes and the global (geographical) position of the umbilical are kept within the limiting values that apply.

According to the present invention there is provided a dynamically working umbilical of the type mentioned by way of introduction which is characterized in that the core member throughout the entire length of the umbilical functions as a load-bearing member only and all fluid transport/ communication takes place peripherally relative to the core member. offhand, it would be considered unfavourable to move the conduits out from the centre account of bending loads. However, this does not have any particular significance for the present umbilical because of the special construction using spacers designed to have channels for receiving current-conducting cables and fluid conduits of small dimensions, where the cables and conduits are axially moveable, or "floating", in said channels, whilst all the components in the umbilical are twisted or layed and behave in principle like a steel rope. In this way great peripheral stresses are avoided.

In one embodiment, the load-bearing member may be a solid rod or stay of a suitable material, such as steel, carbon or titanium.

In a second embodiment, the load-bearing member may be a "stay" built up of twisted or layed single wires.

As one option, the umbilical may be divided into three subsections—one flexible section close to the connection point on the surface, one submersible section in the vertical part from the connection point on the surface and one buoyant section between the submersible section and the connection point on the seabed. In this way, the said catenary form is achieved.

In order to obtain the submersible section, weight elements are placed on the umbilical and the weight elements are threaded onto the outside of the core member of the umbilical. The elements are placed at predetermined intervals and the core member is provided with load-bearing means for transmitting weight or load from the weight elements to the core member.

As mentioned previously, it is known to have a control cable string with a core member which transports fluid along its entire length whilst it also performs a load-bearing function—see the previously mentioned NO 920689 (WO 93/17176). However, it is new to set apart a certain part of the length of the control cable string, especially where the string is exposed to bending loads, such as up towards the connection point on the surface, where the core member only functions as the load-bearing member and the actual fluid transport and any transport of energy and-signal communication take place peripherally relative to the core member.

In the transition between the central fluid flow member and the peripherally arranged flowlines there is a manifold element in the form of a branch pipe disposed and forming communication between the central flowline and the peripheral flowlines.

The manifold element expediently forms a cavity from where the central flowline runs in an axial direction and the various peripheral flowlines run out in the opposite basically axial direction.

The load-bearing central member may be secured to an axial extension of the manifold housing with the aid of suitable attachment means, such as moulding, a compression sleeve, cold welding, cold-heading, welded connections, rivet connections and screw connections.

The principle used to reduce the load on the centre conduit is to replace it with several conduits of smaller dimension, either along the entire length of the cable or along the length of the umbilical where the stress would otherwise be excessively great. This is done, in the last-mentioned case, by ending the large centre conduit in a branch pipe or manifold where there are outlets to the smaller conduits. In order that the smallest load possible is to be transmitted into the smaller conduits, a slightly bendable "rod" is inserted into the centre of the umbilical for this to take most of the tensile load. In the detailed construction made in the transitions to and from the small conduits, importance is given to the increase in flow resistance being as small as possible.

The method used to increase the weight of the umbilical is to place tubular lead elements on the outside of the centre conduits. These elements are held in a stable longitudinal position by welding into place attachment rings on the centre conduits or on special connecting elements along the length of the centre conduit. An intermediate piece is clamped to these attachment rings, which at each end rests against the lead elements. Between each lead element there is placed a flexible ring which distributes the pressure in the contact faces.

In any position along the umbilical where there is a centre conduit, there can be provided an attachment for an external connection such as a mooring. A connecting link having two or more longitudinal wings is welded inside the centre conduit line. These wings are narrow enough to pass through the layer of conduits and/or cables which lie around the centre conduit. The top of the wings project outside the outer sheath and a clamp is secured to these.

BRIEF DESCRIPTION OF THE DRAWINGS

Other and additional objects, features and advantages will be evident from the following description of a, for the time being, preferred embodiment of the invention, which is given for the purposes of description, without thereby being limiting, and is given in conjunction with the attached drawings, wherein.

DESCRIPTION OF THE PREFERRED EMBODIMENTS

Figure 1:
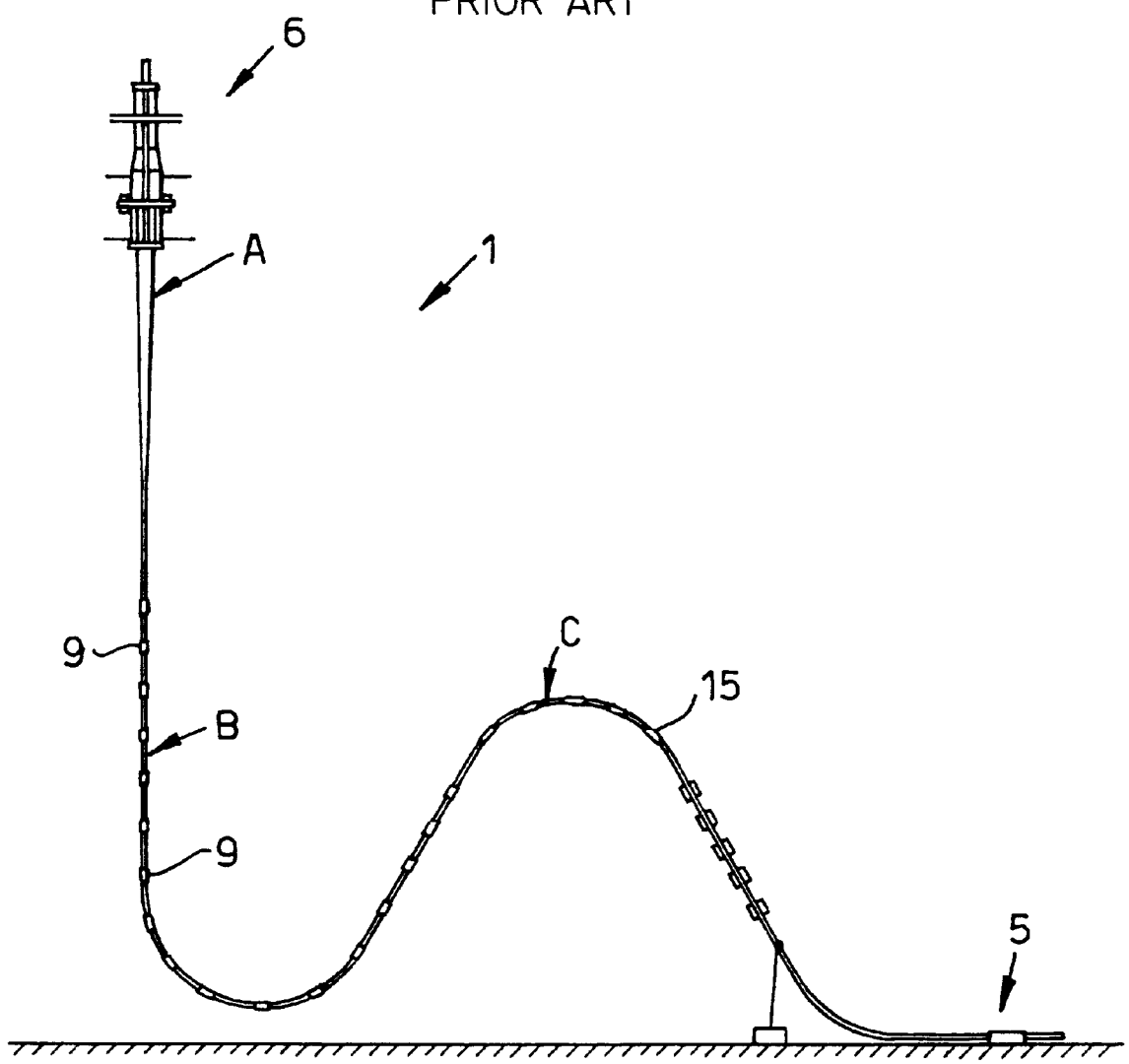
FIG. 1 shows a typical conventional dynamic cable string or umbilical which extends between a connection point on the surface and a connection point on the seabed, and is divided into a stiffened or rigid section, a submersible section and a floating section.
Figure 2:
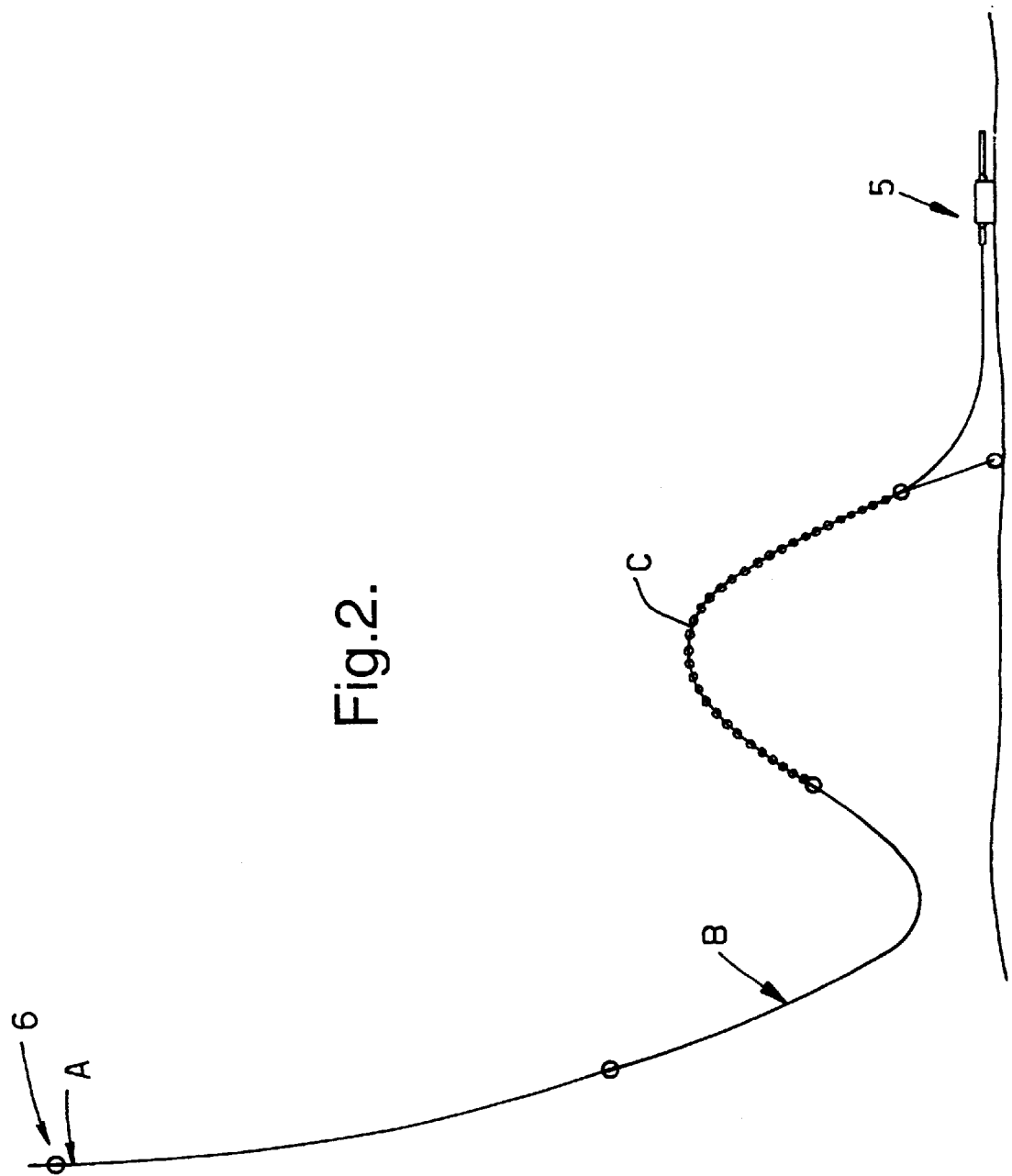
FIG. 2 shows a dynamic control cable string or umbilical which resembles that shown in FIG. 1, but which is rather divided into a flexible section, a submersible section and a floating section.

A typical situation where the present umbilical or control cable string 1 is included as an essential part is shown in FIGS. 1 and 2. In order to bring out the details, FIG. 1 is a somewhat more schematic presentation than FIG. 2, which shows more a real course of the umbilical 1 between a connection point 6 on the surface and a connection point 5 on the seabed. The umbilical 1 is roughly divided into three sections, an upper rigid section A close to the connection point 6 on the surface, a submersible section B at the basically vertical part from said connection point 6 on the surface and a buoyant section C between the submersible section B and connection point 5 on the seabed. The connection point 6 may be a buoy floating on the surface of the water, and can be attached directly or indirectly via another cable to a floating structure or a vessel operating on the surface. The rigid section A shown in FIG. 1 is of the more conventional type with increasing cross-section in the upward direction towards the buoy or the connection point 6. The increasing cross-section is due to the stiffening members which are applied onto the outside of the actual umbilical, which has the same cross-section the whole way between the connections points 5 and 6. This rigid section has been introduced precisely because of the particularly great bending and tensile stresses to which the umbilical is exposed in this area, and is there to take up or withstand these stresses. In the new umbilical 1, the rigid section A is replaced by a flexible section which handles the great forces at work in this area in a different way than the earlier rigid section.

The submersible section B may to advantage include gravity elements, e.g., in the form of leaden weights, which are attached to the umbilical at certain predetermined intervals. These gravity elements are only required when the umbilical's own weight is such that the umbilical tends to float or when the unloaden weight is not sufficient to make the umbilical hang in the desired catenary form.

The floating section C may have buoyancy elements 15 to increase the buoyancy along is a certain predetermined portion of the umbilical 1 in order to achieve the desired catenary form.

The connection point 5 on the seabed may be a wellhead or other equipment on the seabed with the facility for methanol injection into the production stream, or for chemical injection into subterranean formation strata.

Figure 4:
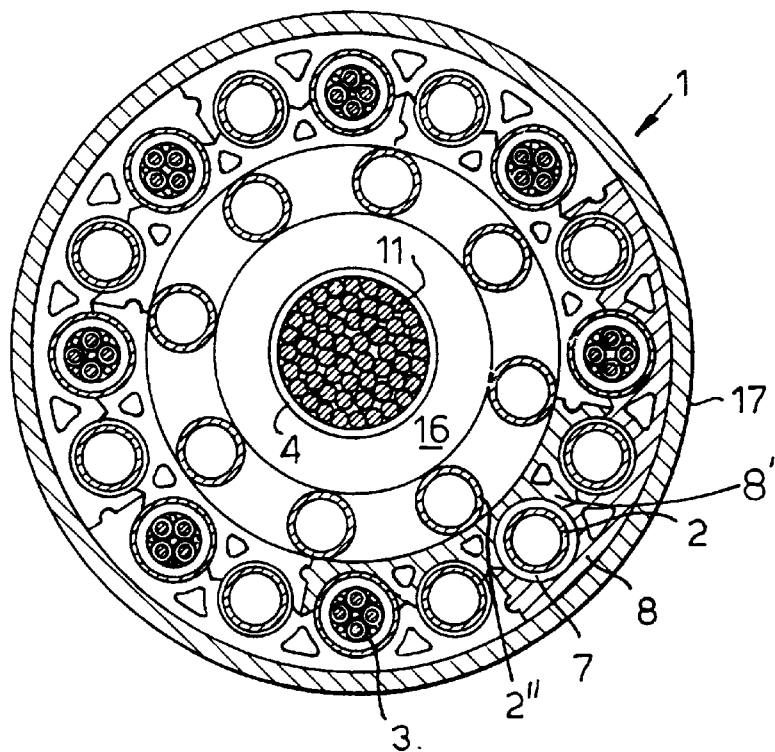
FIG. 4 shows a cross-section through the umbilical along the line IV—IV in FIG. 3 in said portion.

FIG. 4 shows a cross-section through the new umbilical 1. Its structure is as follows: A core member 4 constitutes the load-bearing part, in the application called the rod or stay, of the umbilical 1 so that the essentially axial tensile forces are transmitted through this member 4 and only minimal axial forces are transmitted in the other components of the umbilical. The core member 4 may to advantage be a steel stay consisting of single wires 11. A spacer pipe 16 may, although not necessarily, be placed around the core member 4. This may also quite simply be a cavity—depending upon whether this cross-section is to be found throughout the entire length of the umbilical or only in the flexible section A. On the outside of the spacer pipe 16, there is a first set of fluid flowlines 2" which are also twisted or layed around the core member 4 in the longitudinal direction and with a relatively long laying length. On the outside of the flowlines 2" inner spacers 8' and outer spacers 8, are provided which between them form channels 7 for receiving additional flowlines 2 and electric cables 3. It should be noted in particular that all the elements mentioned above are twisted in the longitudinal direction with a moderate laying length. It should also be noted that a clearance exists between the walls of the channels 7 and the flowlines 2 and cables 3 accommodated in the channels 7, so that the flowlines 2 and the cables 3 are axially moveable in the channels 7 relative to the spacers 8, 8'. This is essential for obtaining a fully flexible umbilical 1. As an outer sheath 17, it would be advantageous to use a plastic covering material.

Figure 5:
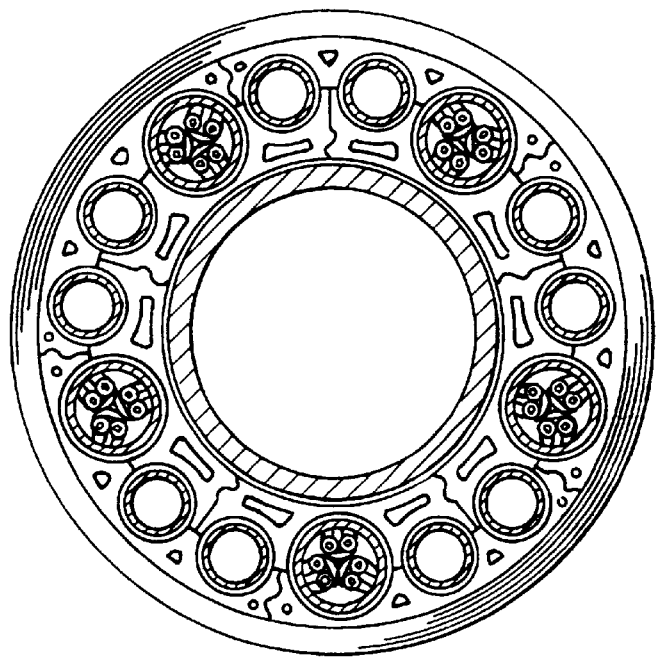
FIG. 5 shows a cross-section through a previously known control cable string (WO93/17176, FIG. 6).

A conceivable possibility is to construct the length of the entire umbilical 1 having the cross-section which is described above. However, in practice the umbilical 1 will probably be constructed in a conventional manner along the greatest part of its length, i.e., it will have a structure identical to that shown in FIG. 5 and described in more detail in WO 93/17176, having a centrally located flowline. In such a situation only the upper flexible section A will have the cross-section shown in FIG. 4 in order to avoid the use of the ever-larger bend stiffeners which are indicated in FIG. 1.

Figure 3:
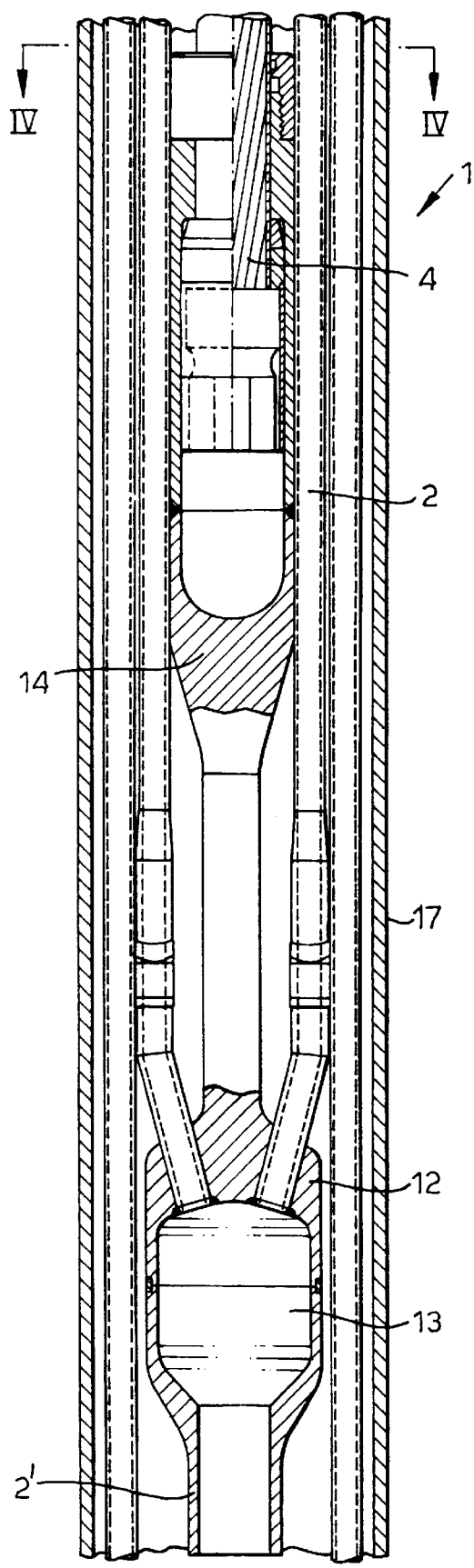
FIG. 3 shows a short portion of the umbilical in the flexible section where the respective flowlines are located peripherally relative to the centre axis of the umbilical.

A part of the flexible section A is shown in FIG. 3. In order to pass the central fluid flow to the peripheral fluid flowlines, a manifold element 12 having an internal cavity 13 is installed. The cavity 13 is in fluid communication with the central flowline 2' at its axial end and with several peripherally arranged flowlines 2 at its other axial end.

In an axial extension 14 of the manifold housing 12, this is secured to a steel stay core member 4 with the aid of suitable attachment means, such as moulding, a compression sleeve, cold welding, cold-heading, welded connections, rivet connections and screw connections. The extension 14 may be in the form of a bar which advantageously is an integral part of the manifold housing 12. The number of flowlines 2 and cables 3 may be varied according to need and the application of the umbilical. There is nothing to prevent the umbilical 1 from having no electric conductors or cables whatsoever and consisting of fluid flowlines only. It should be noted that the peripherally arranged flowlines 2 are also intended to be twisted about the core member 4 along the length of the flexible section A.

A section totally identical to that shown in FIG. 3 but inverted may be provided at the top of the flexible section A close to the connection point on the surface, so that the umbilical 1 at the connection site has the conventional cross-section. However, this is optional and must be adapted to the application in question.

We claim:

1. A dynamic umbilical intended to hang in catenary form between a connection point on the seabed and a connection point located at a sea surface which can be attached to a floating structure, which umbilical is of the type that is low in weight per running meter and comprises:

a core member extending from one to the other end of the umbilical along a longitudinal axis of said umbilical;

a spacer means arranged radially outwardly of the core member and including channels which twist around the core member along the length of said core member, and arranged inside said channels and movable relative to said channels, a first fluid flowline means for at least one fluid, wherein, along at least one first portion of the umbilical, the core member serves as both a load-bearing member and a fluid flow member for a second fluid and wherein, along at least one second portion of the umbilical, the core member serves only as a load-bearing member and a second fluid flowline means for said second fluid is arranged radially outside the core member.

2. A dynamic umbilical according to claim 1, in which said at least one first portion of the umbilical constitutes a major part of the total length of the umbilical.

3. A dynamic umbilical according to claim 1, in which, along said at least one second portion of the umbilical, the core member comprises a solid stay.

4. A dynamic umbilical according to claim 3, in which said solid stay is made of steel, carbon or titanium.

5. A dynamic umbilical according to claim 1, in which along said at least one second portion of the umbilical the core member comprises a stay built up of twisted or twined wires.

6. A dynamic umbilical according to claim 1, comprising a flexible section (A) close to the connection point on the surface, a submersible section (B) at a generally vertical part from the connection point on the surface and a buoyant section (C) between the submersible section (B) and the connection point on the seabed, said sections providing the umbilical with its catenary form.

7. A dynamic umbilical according to claim 6, in which said submersible section (B) includes weight elements threaded onto the outside of the core member and in which, at predetermined intervals along the core member, load-bearing connecting elements are provided for transmitting weight or load from the weight elements to the core member.

8. A dynamic umbilical according to claim 1, in which, a transition between first and second portions of the umbilical, there is provided a manifold element in the form of a branch pipe forming communication between the central core member and the second fluid flowline means.

9. A dynamic umbilical according to claim 8, in which the manifold element forms a cavity which communicates at one of its axial ends with the core member and communicates at the other of its axial ends with the second fluid flowline means.

10. A dynamic umbilical according to claim 9, in which the second flowline means are twisted or twined about the core member along the length of said at least one second portion of the umbilical.

11. A dynamic umbilical according to claim 8, in which the manifold element has an axial extension connected by attachment means to the core member at the second portion of the umbilical.

12. A dynamic umbilical according to claim 11, in which said attachment means comprises a moulding, a compression sleeve, cold welding, cold heading, welded connections, rivet connections and screw connections.

13. A dynamic umbilical or cable string intended to hang in catenary form between a connection point on the seabed and a connection point located at the sea surface and which can be attached to a floating structure, which umbilical is of the type that is low in weight per running meter and comprises flowlines, all of which flowlines are twisted around a longitudinal axis of the umbilical, are radially spaced apart from an axially extending core member and lie in channels in a spacing means for free axial movement of the flowlines in said channels, wherein the core member, throughout the entire length of the umbilical, functions as a load-bearing member and, along part of its length, also provides for fluid transportation.

14. A dynamic umbilical according to claim 1, further comprising current conducting cables arranged inside said channels.

15. A dynamic umbilical or string according to claim 13, further comprising current-conduction cables twisted along the longitudinal axis.

* * * * *